(12) United States Patent
Chen et al.

(10) Patent No.: US 11,226,659 B2
(45) Date of Patent: Jan. 18, 2022

(54) ELECTRONIC DEVICE

(71) Applicant: Acer Incorporated, New Taipei (TW)

(72) Inventors: Hung-Chi Chen, New Taipei (TW);
Shun-Bin Chen, New Taipei (TW);
Huei-Ting Chuang, New Taipei (TW);
Yen-Chieh Chiu, New Taipei (TW);
Yu-Wen Lin, New Taipei (TW);
Yen-Chou Chueh, New Taipei (TW);
Po-Yi Lee, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 17/072,050

(22) Filed: Oct. 16, 2020

(65) Prior Publication Data

US 2021/0223824 A1 Jul. 22, 2021

(30) Foreign Application Priority Data

Jan. 16, 2020 (TW) .................................. 109101606

(51) Int. Cl.
*G06F 1/16* (2006.01)
*H01H 3/12* (2006.01)

(52) U.S. Cl.
CPC .......... *G06F 1/1666* (2013.01); *G06F 1/1677* (2013.01); *H01H 3/125* (2013.01); *G06F 1/1616* (2013.01); *G06F 1/1664* (2013.01); *H01H 2221/068* (2013.01)

(58) Field of Classification Search
CPC .... G06F 1/1664; G06F 1/1666; G06F 1/1616; H01H 3/125; H01H 2221/068
See application file for complete search history.

(56) References Cited

U.S. PATENT DOCUMENTS

| 5,635,928 A | * | 6/1997 | Takagi | G06F 1/1616 341/22 |
| 5,874,696 A | * | 2/1999 | Hayashi | H01H 13/705 200/5 A |
| 6,087,966 A | * | 7/2000 | Sato | G06F 3/023 200/345 |

(Continued)

FOREIGN PATENT DOCUMENTS

| TW | 539175 | 6/2003 |
| TW | I616921 | 3/2018 |

(Continued)

*Primary Examiner* — Nidhi Thaker
(74) *Attorney, Agent, or Firm* — JCIPRNET

(57) ABSTRACT

An electronic device includes a host, a display, a sliding plate, and a keyboard. The host has an operating surface. The display is pivoted to the host. The sliding plate is slidably disposed in the host, where the display is mechanically coupled to the sliding plate, and the sliding plate includes a plat portion and a recess portion that are arranged side by side. The keyboard is integrated to the host. The keyboard includes a key structure, where the key structure includes a key cap and a reciprocating element, and the key cap is exposed from the operating surface of the host. The reciprocating element is disposed between the key cap and the sliding plate and has a first end connected to the key cap and a second end contacting the sliding plate. The second end is located on a sliding path of the plat portion and the recess portion.

8 Claims, 4 Drawing Sheets

(56) References Cited

U.S. PATENT DOCUMENTS

| | | | | |
|---|---|---|---|---|
| 6,172,868 B1* | 1/2001 | Oura | ...................... | H01H 3/125 |
| | | | | 361/679.2 |
| 8,581,127 B2* | 11/2013 | Jhuang | ................... | H01H 13/83 |
| | | | | 200/314 |
| 2013/0334018 A1* | 12/2013 | Hsu | ....................... | G06F 1/1666 |
| | | | | 200/341 |
| 2020/0201399 A1* | 6/2020 | Guy | ........................ | H01H 3/122 |
| 2020/0211796 A1* | 7/2020 | Li | .......................... | G06F 1/1666 |

FOREIGN PATENT DOCUMENTS

| | | |
|---|---|---|
| TW | I656550 | 4/2019 |
| TW | I680479 | 12/2019 |

\* cited by examiner

ELECTRONIC DEVICE

CROSS-REFERENCE TO RELATED APPLICATION

This application claims the priority benefit of Taiwan application serial no. 109101606, filed on Jan. 16, 2020. The entirety of the above-mentioned patent application is hereby incorporated by reference herein and made a part of this specification.

BACKGROUND OF THE DISCLOSURE

1. Field of the Disclosure

The disclosure relates to an electronic device, and in particular, to an electronic device including a keyboard.

2. Description of Related Art

As a common physical input interface, a keyboard is used by a user to input information to an electronic device, or operate an electronic device. By using a notebook computer as an example, the notebook computer includes a host, a keyboard integrated to the host, and a display. The display is pivoted to the host, and configured to open or close relative to the host. On the other hand, the keyboard includes a key structure, and a key cap of the key structure is exposed from an operating surface of the host (that is, a surface that is in the host and faces the display).

Generally, the key cap of the key structure has a pressing surface for the user to press, and the key cap is mostly designed to be aligned with the operating surface of the host, or designed to be slightly lower than the operating surface of the host, to prevent the key structure from being squeezed by the display covering the operating surface of the host. However, the foregoing design may reduce a pressing stroke of the key structure, resulting in the problem of poor sense of touch during operation.

SUMMARY OF THE DISCLOSURE

The disclosure provides an electronic device, which can improve operation experience of a user, and improve service life of a product.

The disclosure provides an electronic device, including a host, a display, a sliding plate, and a keyboard. The host has an operating surface. The display is pivoted to the host. The sliding plate is slidably disposed in the host, where the display is mechanically coupled to the sliding plate, and the sliding plate includes a plat portion and a recess portion that are arranged side by side. The keyboard is integrated to the host. The keyboard includes a key structure, where the key structure includes a key cap and a reciprocating element, and the key cap is exposed from the operating surface of the host. The reciprocating element is disposed between the key cap and the sliding plate and has a first end and a second end. The first end is connected to the key cap, and the second end contacts the sliding plate. The second end is located on a sliding path of the plat portion and the recess portion.

Based on the foregoing, in the electronic device of the disclosure, with opening or closing of the display relative to the host, a height of the key cap of the key structure changes. Furthermore, when the display is opened relative to the host, the key cap of the key structure is higher than the operating surface of the host. Therefore, a sufficient pressing stroke can be provided for a user, to improve operation experience of the user. On the contrary, when the display covers the operating surface of the host, the key cap of the key structure is lower than the operating surface of the host. Therefore, the key structure can be prevented from being squeezed by the display covering the operating surface of the host, thereby improving the service life of the product.

In order to make the foregoing features and advantages of the disclosure more comprehensible, embodiments are hereinafter described in detail with reference to the accompanying drawings.

DESCRIPTION OF THE EMBODIMENTS

Figure 1A:
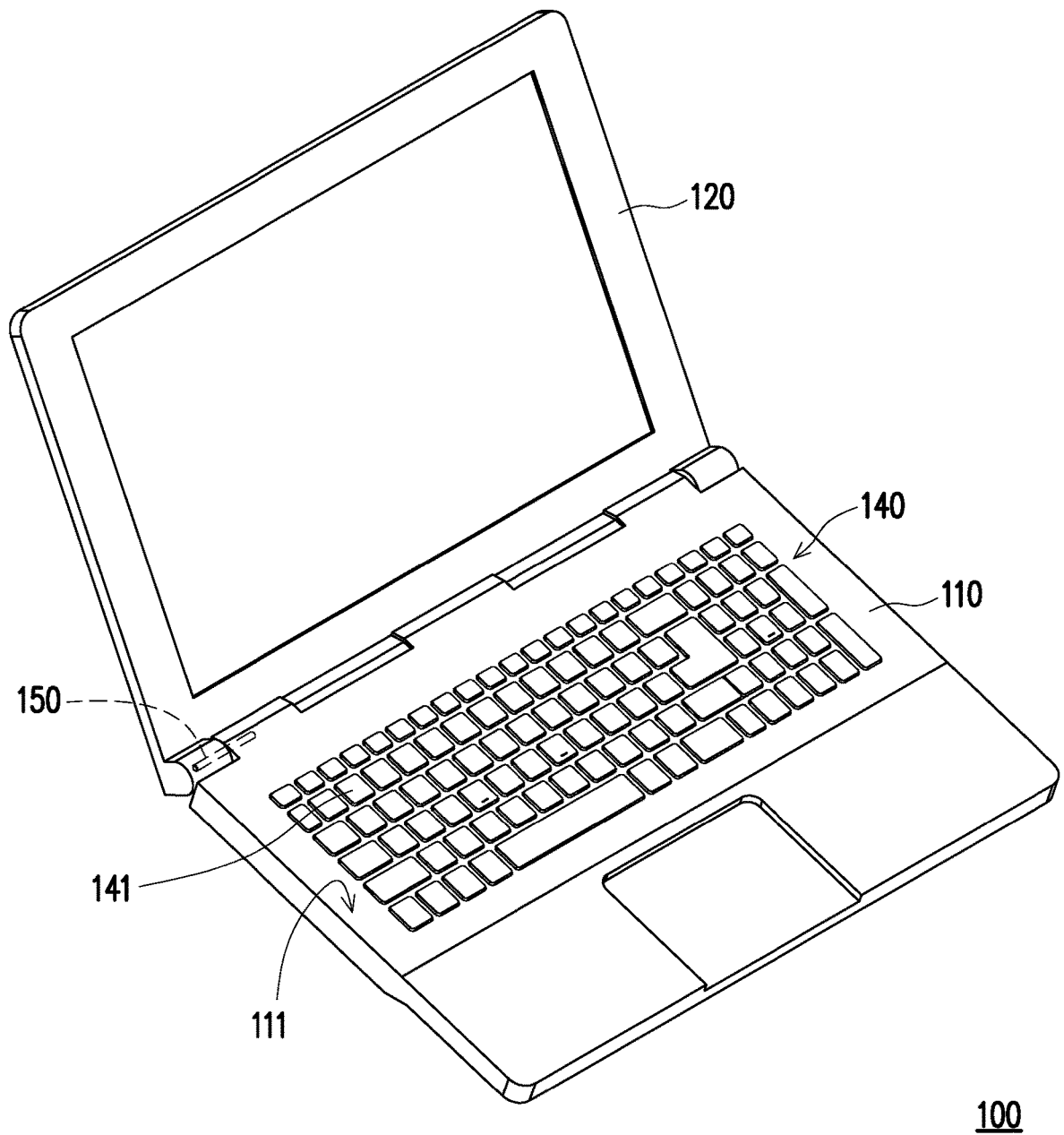
FIG. 1A is a schematic diagram of an electronic device in an opening state according an embodiment of the disclosure.
Figure 1B:
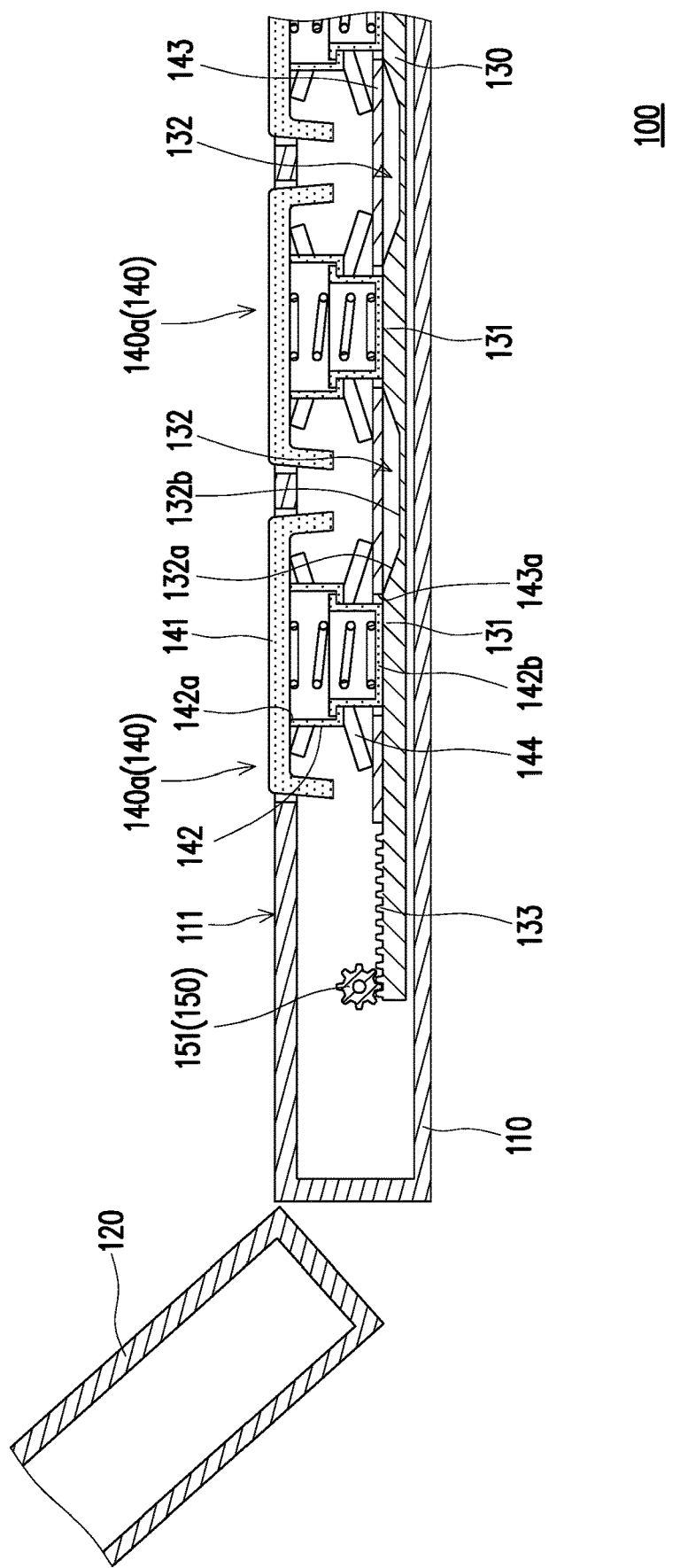
FIG. 1B is a schematic partial cross-sectional view of the electronic device of FIG. 1A.
Figure 2A:
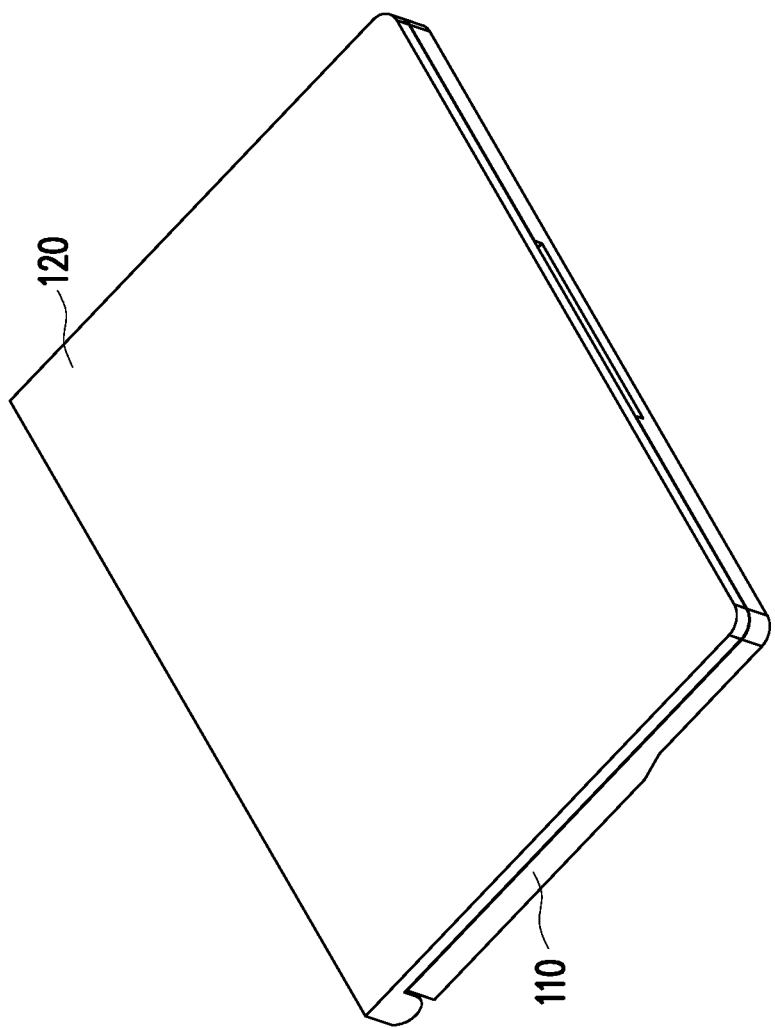
FIG. 2A is a schematic diagram of an electronic device in a closed state according an embodiment of the disclosure.
Figure 2B:
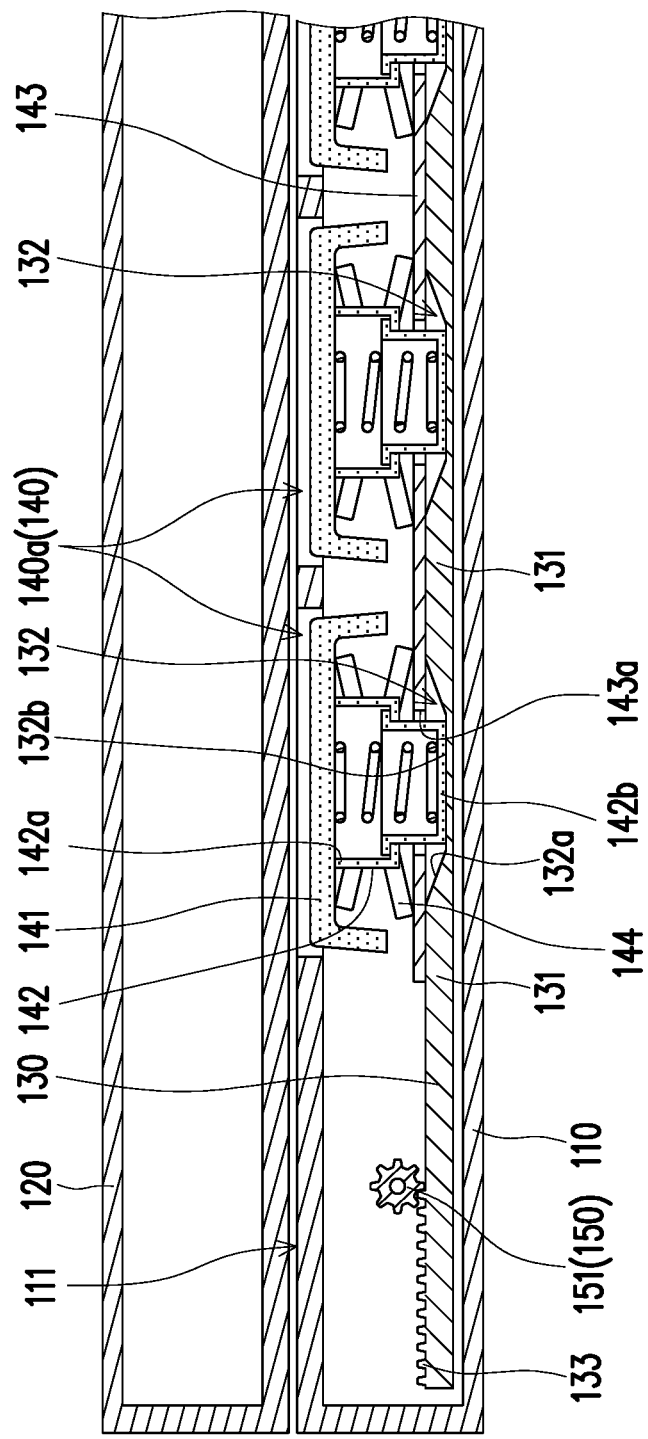
FIG. 2B is a schematic partial cross-sectional view of the electronic device of FIG. 2A.

FIG. 1A is a schematic diagram of an electronic device in an opening state according an embodiment of the disclosure. FIG. 1B is a schematic partial cross-sectional view of the electronic device of FIG. 1A. FIG. 2A is a schematic diagram of an electronic device in a closed state according an embodiment of the disclosure. FIG. 2B is a schematic partial cross-sectional view of the electronic device of FIG. 2A. First referring to FIG. 1A and FIG. 2A, in the present embodiment, an electronic device 100 may be a notebook computer, and includes a host 110 and a display 120. The display 120 is pivoted to the host 110, and is configured to open relative to the host 110, or cover the host 110.

Referring to FIG. 1A, FIG. 1B, and FIG. 2B, the electronic device 100 further includes a sliding plate 130 and a keyboard 140, the sliding plate 130 is slidably disposed in the host 110, and the display 120 is mechanically coupled to the sliding plate 130. In an opening or closing process of the display 120 relative to the host 110, the sliding plate 130 is driven by the display 120 to slide back and forth relative to the host 110 along a specific direction. The keyboard 140 is integrated to the host 110 and includes a key structure 140a, and there are a plurality of key structures 140a.

Specifically, the key structure 140a includes a key cap 141 and a reciprocating element 142, the host 110 has an operating surface 111, and the key cap 141 is exposed from the operating surface 111 for a user to operate the key structure 140a. The reciprocating element 142 is disposed between the key cap 141 and the sliding plate 130 and configured to support the key cap 141 and provide a reset force for the key cap 141. Furthermore, the reciprocating element 142 may include a first end 142a and a second end 142b, the first end 142a is connected to the key cap 141, and the second end 142b contacts the sliding plate 130.

For example, the reciprocating element 142 may include a spring and a telescopic cover, the spring is disposed in the telescopic cover, one end of the telescopic cover is connected to key cap 141, and the other end of the telescopic cover contacts the sliding plate 130. On the other hand, one end of the spring contacts the key cap 141, and the other end of the spring contacts a bottom part of the telescopic cover.

In the present embodiment, the sliding plate 130 includes a plat portion 131 and a recess portion 132 that are arranged side by side, there may be a plurality of recess portions 132, and the quantity of the recess portions 132 is equal to the quantity of the key structures 140a. Specifically, the reciprocating element 142 is located on a sliding path of the plat portion 131 and the recess portion 132. As shown in FIG. 1B, when the display 120 is opened relative to the host 110, the reciprocating element 142 contacts the plat portion 131, and the key cap 141 is higher than the operating surface 111. Therefore, a sufficient pressing stroke can be provided for the user, thereby improving operation experience of the user.

As shown in FIG. 2B, when the display 120 covers the operating surface 111 of the host 110, the sliding plate 130 slides to make the second end 142b of the reciprocating element 142 move away from the plat portion 131 and move into the recess portion 132. At the same time, the key cap 141 sinks along with the reciprocating element 142 to make the key cap 141 be lower than the operating surface 111. Therefore, the key structure 140a can be prevented from being squeezed by the display 120 covering the operating surface 111 of the host 110, thereby improving the service life of the product.

In particular, a direction in which the key cap 141 sinks along with the reciprocating element 142 is perpendicular to a sliding direction of the sliding plate 130.

Referring to FIG. 1A and FIG. 1B, in the present embodiment, the electronic device 100 further includes a rotating shaft 150, and the display 120 is pivoted to the host 110 by using the rotating shaft 150. In detail, the rotating shaft 150 includes a driving portion 151 located in the host 110, and the driving portion 151 is mechanically coupled to the sliding plate 130. On the other hand, the sliding plate 130 further includes a driven portion 133 close to the rotating shaft 150, and the driving portion 151 is mechanically coupled to the driven portion 133. For example, the driving portion 151 is a gear, and the driven portion 133 is a rack meshed with the gear 151. In the opening or closing process of the display 120 relative to the host 110, the driving portion 151 rotates relative to the host 110 and drives the rack to make the sliding plate 130 slide.

Referring to FIG. 1B and FIG. 2B, the recess portion 132 has a chamfer 132a and a bottom surface 132b connected to the chamfer 132a, and the chamfer 132a is connected to the plat portion 131. When the sliding plate 130 slides, the second end 142b of the reciprocating element 142 moves from the plat portion 131 to pass through the chamfer 132a, and stops moving after contacting the bottom surface 132b. Alternatively, when the sliding plate 130 slides, the second end 142b of the reciprocating element 142 moves from the bottom surface 132b to pass through the chamfer 132a, and stops moving after contacting the plat portion 131.

A height difference exists between the plat portion 131 and the bottom surface 132b of the recess portion 132. Therefore, a height of the key cap 141 changes as the second end 142b of the reciprocating element 142 contacts the plat portion 131 or contacts the bottom surface 132b of the recess portion 132. On the other hand, the plat portion 131 is parallel to the bottom surface 132b of the recess portion 132, to avoid skew between the key cap 141 and the reciprocating element 142.

In the present embodiment, the keyboard 140 further includes a carrier 143 fixed in the host 110, and the carrier 143 is disposed on the sliding plate 130. In other words, in the opening or closing process of the display 120 relative to the host 110, the carrier 143 is fixed, but the sliding plate 130 slides relative to the carrier 143. On the other hand, the key cap 141 is disposed above the carrier 143, the carrier 143 has a through hole 143a, and the second end 142b of the reciprocating element 142 penetrates through the through hole 143a to contact the sliding plate 130. The quantity of through holes 143a of the carrier 143 is equal to the quantity of the key structures 140a.

The key structure 140a further includes a scissor mechanism 144, and the scissor mechanism 144 is disposed between the key cap 141 and the carrier 143, and is configured to stabilize a moving direction of the key cap 141 when being pressed, or a moving direction of the key cap 141 when being reset. On the other hand, two ends of the scissor mechanism 144 respectively contact the key cap 141 and the carrier 143. Based on guidance of the scissor mechanism 144, the moving direction of the key cap 141 is perpendicular to the sliding direction of the sliding plate 130.

In conclusion, in the electronic device of the disclosure, with opening or closing of the display relative to the host, the height of the key cap of the key structure changes. Furthermore, when the display expands relative to the host, the key cap of the key structure is higher than the operating surface of the host. Therefore, sufficient pressing stroke can be provided for the user, thereby improving operation experience of the user. On the contrary, when the display covers the operating surface of the host, the key cap of the key structure is lower than the operating surface of the host. Therefore, the key structure can be prevented from being squeezed by the display covering the operating surface of the host, thereby improving the service life of the product.

Although the disclosure has been disclosed as above with the embodiments, the embodiments are not intended to limit the disclosure. A person with ordinary knowledge in the technical field can make some changes and modifications without departing from the spirit and scope of the disclosure. Therefore, the protection scope of the disclosure shall be subject to the attached claims.

What is claimed is:

1. An electronic device, comprising:
    a host, comprising an operating surface;
    a display, pivoted to the host;
    a sliding plate, slidably disposed in the host, wherein the display is mechanically coupled to the sliding plate, and the sliding plate comprises a plat portion and a recess portion that are arranged side by side; and
    a keyboard, integrated to the host, and comprising a key structure, wherein the key structure comprises a key cap and a reciprocating element, the key cap is exposed from the operating surface of the host, the reciprocating element is disposed between the key cap and the sliding plate and comprises a first end and a second end, the first end is connected to the key cap, and the second end contacts the sliding plate and is located on a sliding path of the plat portion and the recess portion,
    when the display is opened relative to the host, the second end of the reciprocating element contacts the plat portion, when the display covers the operating surface of the host, the second end of the reciprocating element move away from the plat portion and move into the recess portion.

2. The electronic device according to claim 1, further comprising:
    a rotating shaft, wherein the display is pivoted to the host by using the rotating shaft, the rotating shaft comprises a driving portion located in the host, and the driving portion is mechanically coupled to the sliding plate.

3. The electronic device according to claim 2, wherein the sliding plate further comprises a driven portion close to the rotating shaft, and the driving portion is mechanically coupled to the driven portion.

4. The electronic device according to claim 3, wherein the driving portion is a gear, and the driven portion is a rack meshed with the gear.

5. The electronic device according to claim 1, wherein the recess portion comprises a chamfer and a bottom surface connected to the chamfer, and the chamfer is connected to the plat portion.

6. The electronic device according to claim 5, wherein a height difference exists between the plat portion and the bottom surface of the recess portion, and the plat portion is parallel to the bottom surface of the recess portion.

7. The electronic device according to claim 1, wherein the keyboard further comprises a carrier that is fixed in the host and disposed on the sliding plate, the key cap is disposed above the carrier, the carrier is provided with a through hole, and the second end of the reciprocating element penetrates through the through hole to contact the sliding plate.

8. The electronic device according to claim 7, wherein the key structure further comprises a scissor mechanism, and the scissor mechanism is disposed between the key cap and the carrier.

* * * * *